United States Patent
Hong et al.

(10) Patent No.: US 8,749,925 B2
(45) Date of Patent: Jun. 10, 2014

(54) PROTECTING HARD BIAS MAGNETS DURING A CMP PROCESS USING A SACRIFICIAL LAYER

(75) Inventors: Ying Hong, Morgan Hill, CA (US); Ming Jiang, San Jose, CA (US); John Westwood, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 670 days.

(21) Appl. No.: 11/965,648

(22) Filed: Dec. 27, 2007

(65) Prior Publication Data

US 2009/0169732 A1  Jul. 2, 2009

(51) Int. Cl.
*G11B 5/33* (2006.01)

(52) U.S. Cl.
USPC ............. 360/324; 360/324.11; 360/324.12; 360/327.1; 360/327.3

(58) Field of Classification Search
USPC ......... 360/324.12, 324, 324.11, 327.1, 327.3
See application file for complete search history.

(56) References Cited

U.S. PATENT DOCUMENTS

| | | | |
|---|---|---|---|
| 6,219,207 B1 * | 4/2001 | Pinarbasi | 360/322 |
| 6,636,392 B2 * | 10/2003 | Ito et al. | 360/324.1 |
| 6,989,972 B1 * | 1/2006 | Stoev et al. | 360/322 |
| 7,112,861 B2 * | 9/2006 | Kanakasabapathy et al. | 257/421 |
| 2001/0014001 A1 * | 8/2001 | Aoshima et al. | 360/327.32 |
| 2004/0061986 A1 * | 4/2004 | Kagami et al. | 360/324.11 |
| 2005/0018365 A1 * | 1/2005 | Gill | 360/324.11 |
| 2006/0176622 A1 * | 8/2006 | Pinarbasi | 360/324.12 |
| 2006/0279881 A1 * | 12/2006 | Sato | 360/324.12 |
| 2006/0291097 A1 * | 12/2006 | Honda et al. | 360/126 |

* cited by examiner

*Primary Examiner* — Wayne Young
*Assistant Examiner* — Carlos E Garcia
(74) *Attorney, Agent, or Firm* — Duft Bornsen & Fettig, LLP (57) ABSTRACT

Read elements and associated methods of fabrication are disclosed. During fabrication of the read element, and more particularly, the fabrication of the hard bias magnets, a non-magnetic sacrificial layer is deposited on top of the hard bias material. When a CMP process is subsequently performed, the sacrificial layer is polished instead of the hard bias material. The thicknesses of the hard bias magnets are not affected by the CMP process, but are rather defined by the deposition process of the hard bias material. As a result, the variations in the CMP process will not negatively affect the magnetic properties of the hard bias magnets so that they are able to provide substantially uniform effective magnetic fields to bias the free layer of the magnetoresistance (MR) sensor of the read element.

10 Claims, 7 Drawing Sheets

PROTECTING HARD BIAS MAGNETS DURING A CMP PROCESS USING A SACRIFICIAL LAYER

BACKGROUND OF THE INVENTION

1. Field of the Invention

The invention is related to the field of magnetic recording heads and, in particular, to using a sacrificial layer that protects hard bias magnets during a chemical mechanical polishing (CMP) process.

2. Statement of the Problem

Many computer systems use magnetic disk drives for mass storage of information. Magnetic disk drives typically include one or more magnetic recording heads (sometimes referred to as sliders) that include read elements and write elements. An actuator/suspension arm holds the recording head above a magnetic disk. When the magnetic disk rotates, an air flow generated by the rotation of the magnetic disk causes an air bearing surface (ABS) side of the recording head to fly a particular height above the magnetic disk. The height depends on the shape of the ABS. As the recording head rides on the air bearing, an actuator moves the actuator/suspension arm to position the read element and the write element over selected tracks of the magnetic disk.

To read data from the magnetic disk, transitions on a track of the magnetic disk emit magnetic fields. As the read element passes over the transitions, the magnetic fields of the transitions modulate the resistance of the read element. The change in resistance of the read element is detected by passing a sense current through the read element, and then measuring the change in bias voltage across the read element to generate a read signal. The resulting read signal is used to recover the data encoded on the track of the magnetic disk.

The most common types of read elements are magnetoresistive (MR) read elements. A typical MR read element includes a MR sensor fabricated between a pair of shields. The MR sensor may be a Giant MR (GMR) sensor, a Tunneling MR (TMR) sensor, or another type of MR sensor. A GMR sensor implementing two layers of ferromagnetic material (e.g., NiFe) separated by a layer of nonmagnetic material (e.g., Cu) is generally referred to as a spin valve (SV) sensor. A simple-pinned SV sensor generally includes an antiferromagnetic (AFM) pinning layer, a ferromagnetic pinned layer, a spacer layer, and a ferromagnetic free layer. The pinned layer has its magnetization typically fixed (pinned) by exchange coupling with the AFM pinning layer. The pinning layer generally fixes the magnetic moment of the pinned layer perpendicular to the ABS of the recording head. The magnetization of the free layer is not fixed and is free to rotate in response to the magnetic field from the magnetic disk. The magnetic moment of the free layer is free to rotate upwardly and downwardly with respect to the ABS in response to positive and negative magnetic fields from the rotating magnetic disk. The free layer is separated from the pinned layer by the nonmagnetic spacer layer.

A TMR sensor comprises first and second ferromagnetic layers separated by a thin, electrically insulating, tunnel barrier layer. The tunnel barrier layer is sufficiently thin, that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetic moments, or magnetization directions, of the two ferromagnetic layers. In the TMR sensor, the ferromagnetic pinned layer has its magnetic moment pinned, while ferromagnetic free layer has its magnetic moment free to rotate in response to an external magnetic field from the magnetic disk. When a sense current is applied, the resistance of the TMR sensor is a function of the tunneling current across the insulating layer between the ferromagnetic layers. The tunneling current flows perpendicularly through the tunnel barrier layer, and depends on the relative magnetization directions of the two ferromagnetic layers. A change of direction of magnetization of the free layer causes a change in resistance of the TMR, which is reflected in voltage across the TMR sensor.

Designers of read elements use different techniques to stabilize the magnetic moment of the free layer. Although the magnetic moment of the free layer is free to rotate upwardly or downwardly with respect to the ABS in response to positive and negative magnetic fields from the magnetic disk, it is important to longitudinally bias the free layer (biased parallel to the ABS and parallel to the major planes of the layers of the read element) to avoid unwanted movement or jitter of the magnetic moment of the free layer. Unwanted movement of the magnetic moment adds noise and unwanted frequencies to the signals read from the read element.

One method used to stabilize the magnetic moment of the free layer is to bias the free layer using first and second hard bias magnets that are adjacent to the sides of the MR sensor. Examples of hard bias magnets are CoPt or CoPtCr. The magnetic moments of the hard bias magnets stabilize the magnetic moment of the free layer of the MR sensor.

To fabricate a read element with hard bias magnets, MR material is deposited on a first shield, and a first photoresist is patterned on the MR material to define a stripe height of an MR sensor. An ion milling process is then performed to remove the portions of MR material exposed by the first photoresist, and refill material is deposited. The first photoresist is then removed. Next, a chemical mechanical polishing (CMP) stop layer is deposited on the top surface of the MR material and the refill material. The CMP stop layer may be a diamond-like carbon (DLC) or another type of material. A bottom anti-reflective coating (BARC) layer is then deposited on the CMP stop layer, and a second photoresist is patterned on the BARC layer. The second photoresist is used to define the track width of the MR sensor. A reactive ion etching (RIE) process is then performed to remove the BARC layer and the CMP stop layer exposed by the second photoresist. An ion milling process is then performed to remove the portions of the MR material and the refill material exposed by the second photoresist. After the milling process, the stripe height and track width of the MR sensor is defined.

To form the hard bias magnets on either side of the MR sensor, a thin layer of insulation material is deposited. Next, hard bias material, including one or more seed layers and magnetic material, for the hard bias magnets is deposited. The hard bias material is typically deposited so that the top surface of the hard bias material is above the top surface of the CMP stop layer. A CMP process is then performed down to the CMP stop layer to planarize the top surface of the layers. The CMP process removes the second photoresist, and also removes the hard bias material that extends above the CMP stop layer. Thus, the CMP process defines the final thickness of the hard bias magnets. A second shield may then be deposited to form the read element.

When the thicknesses of the hard bias magnets on each side of the MR sensor are defined with the CMP process, the hard bias magnets on each side of the MR sensor may unfortunately have non-uniform thicknesses due to variations in the CMP process. The thickness variations may be between magnets on each side of the MR sensor, or between magnets on different read elements. Also, the top surfaces of the hard bias magnets on each side of the MR sensor may not be planar. When the hard bias magnets on each side of the MR sensor have non-uniform thicknesses and differently-shaped top surfaces, the hard bias magnets unfortunately have different effective magnetic fields. Thus, the hard bias magnets do not uniformly bias the magnetic moment of the free layer.

It would therefore be desirable to define the thickness of hard bias magnets in a different way.

SUMMARY

Embodiments of the invention solve the above and other related problems by depositing a non-magnetic sacrificial layer on top of the hard bias material during fabrication of the read element. The CMP process then polishes the sacrificial layer instead of the hard bias material. The thicknesses of the hard bias magnets are not affected by the CMP process, but are rather defined by the deposition process of the hard bias material. As a result, variations in the CMP process will not negatively affect the magnetic properties of the hard bias magnets so that they are able to provide substantially uniform effective magnetic fields to bias the free layer of the MR sensor. This advantageously leads to improved stability in the read element.

One embodiment of the invention comprises a method of fabricating a read element of a magnetic recording head. The method includes forming a magnetoresistance (MR) sensor on a first shield using a photoresist to define the track width of the MR sensor. The method further includes depositing an insulating layer on the photoresist and side regions of the MR sensor, and depositing hard bias material on the insulating layer. The method further includes depositing a non-magnetic sacrificial layer on the hard bias material. The method further includes performing a chemical mechanical polishing (CMP) process which removes the photoresist and planarizes the top surface of the sacrificial layer. The result of the method is that the sacrificial layer is polished during the CMP process, and not the hard bias material. Thus, the thicknesses of the hard bias magnets are not affected by the CMP process.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-19 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
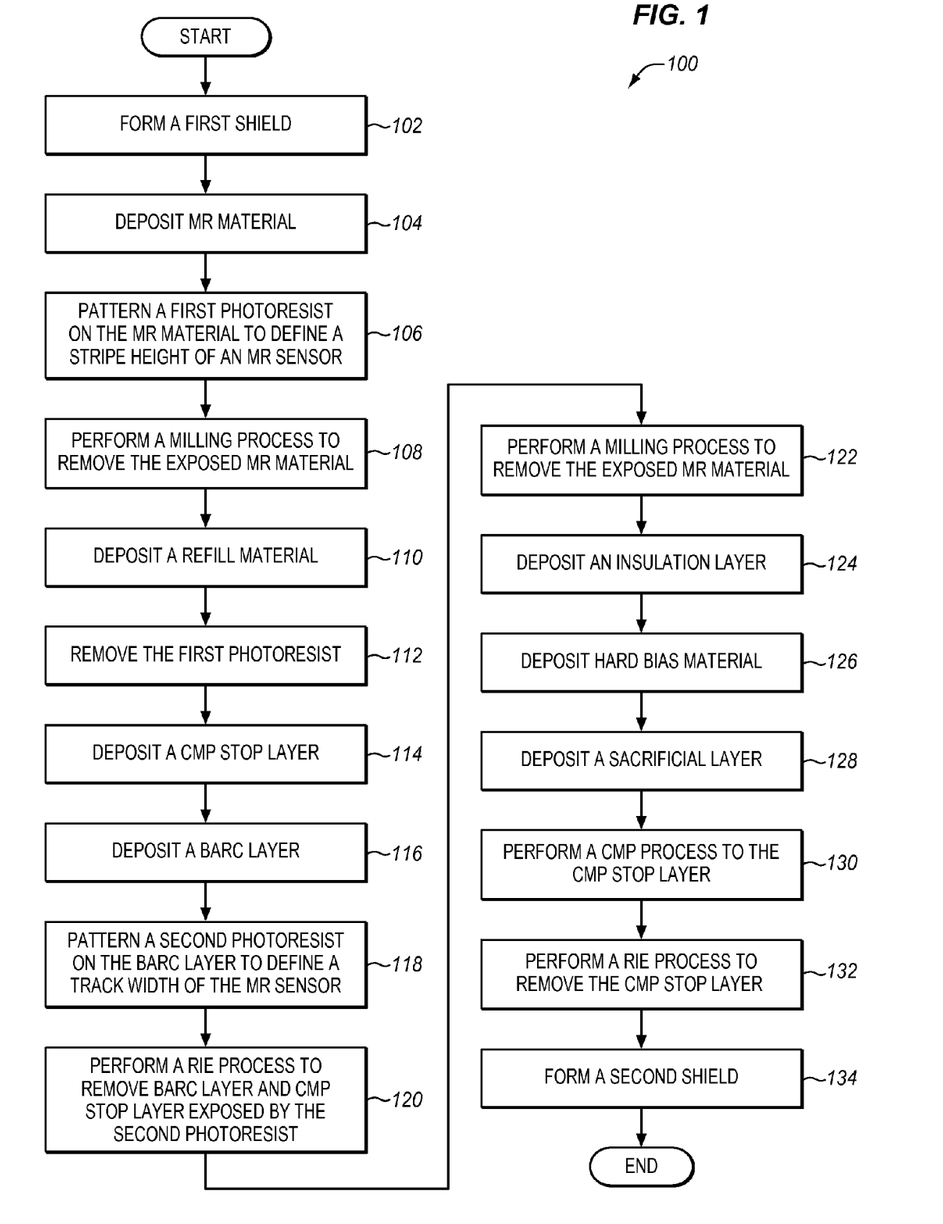
FIG. 1 is a flow chart illustrating a method of fabricating a read element of a magnetic recording head in an exemplary embodiment of the invention.

FIG. 1 is a flow chart illustrating a method 100 of fabricating a read element of a magnetic recording head in an exemplary embodiment of the invention. FIGS. 2-18 illustrate the results of the steps of method 100 to fabricate a read element 200 in exemplary embodiments of the invention. Method 100 is just one example of how to fabricate a read element, as other methods may be performed in other embodiments to fabricate read element 200.

Figure 2:
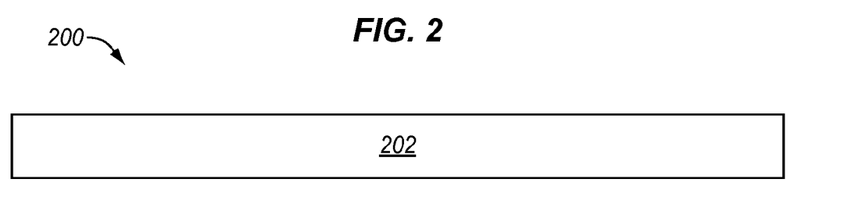
FIG. 2 is a cross-sectional view of a read element with a first shield formed according to the method of FIG. 1.

Step 102 comprises forming a first shield 202 (see FIG. 2). FIG. 2 is a cross-sectional view of read element 200 with first shield 202 formed according to step 102. First shield 202 may be formed by depositing electrically conductive material, such as NiFe, full-film on a substrate (not shown) and plagiarizing the top surface of the conductive material.

Figure 3:
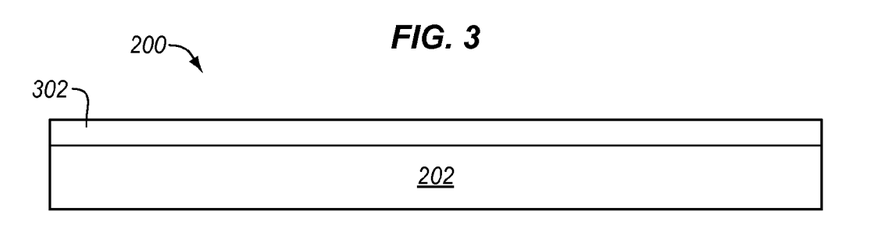
FIG. 3 is a cross-sectional view of a read element with MR material deposited according to the method of FIG. 1.

Step 104 of FIG. 1 comprises depositing magnetoresistance (MR) material on the first shield 202. Depositing MR material is a multi-layer deposition process for depositing a pinning layer, a pinned layer, a spacer/barrier layer, a free layer, etc. FIG. 3 is a cross-sectional view of read element 200 with MR material 302 deposited according to step 104.

Figure 4:
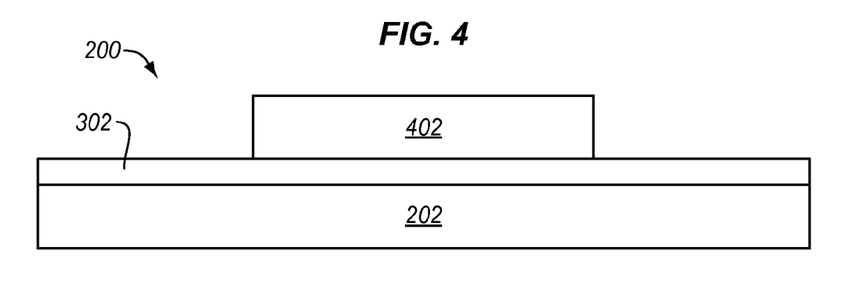
FIG. 4 is a cross-sectional view of a read element with a first photoresist patterned according to the method of FIG. 1.
Figure 5:
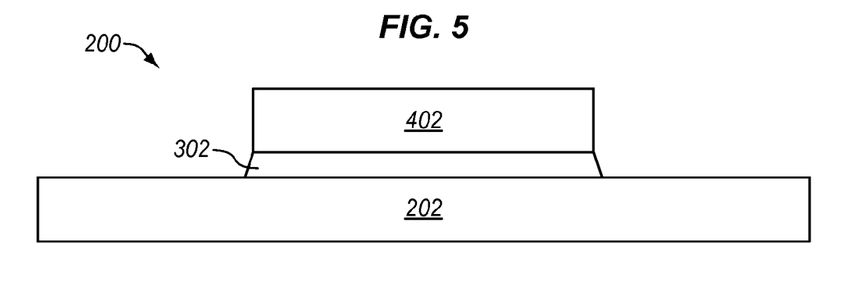
FIG. 5 is a cross-sectional view of a read element after an ion milling process of the method of FIG. 1.
Figure 6:
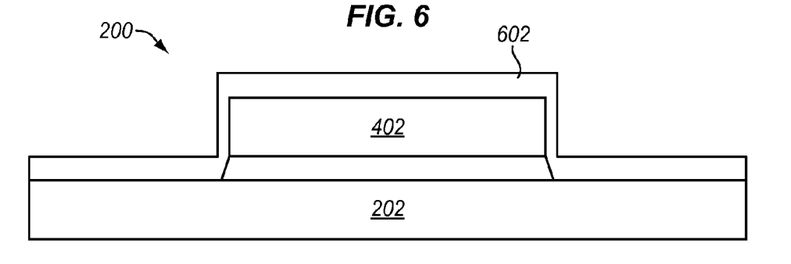
FIG. 6 is a cross-sectional view of a read element with refill material deposited according to the method of FIG. 1.
Figure 7:
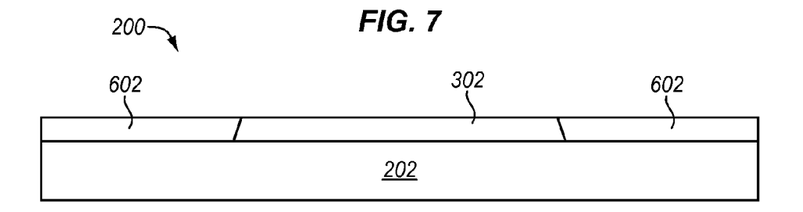
FIG. 7 is a cross-sectional view of a read element with a first photoresist removed according to the method of FIG. 1.

Step 106 of FIG. 1 comprises patterning a first photoresist on MR material 302 to define a stripe height of an MR sensor. FIG. 4 is a cross-sectional view of read element 200 with first photoresist 402 patterned according to step 106. Step 108 of FIG. 1 comprises performing an ion milling process, or another type of removal process, to remove the MR material 302 exposed by photoresist 402. FIG. 5 is a cross-sectional view of read element 200 after the ion milling process of step 108. Step 110 of FIG. 1 comprises depositing refill material. Refill material comprises some type of insulating material, such as alumina. FIG. 6 is a cross-sectional view of read element 200 with refill material 602 deposited according to step 110. Step 112 of FIG. 1 comprises removing the first photoresist 402. Photoresist 402 may be removed with a Chemical Mechanical Polishing (CMP) assisted lift-off process. FIG. 7 is a cross-sectional view of read element 200 with photoresist 402 removed according to step 112. The removal of photoresist 402 also removes the refill material 602 deposited on top of photoresist 402, which exposes MR material 302.

Figure 8:
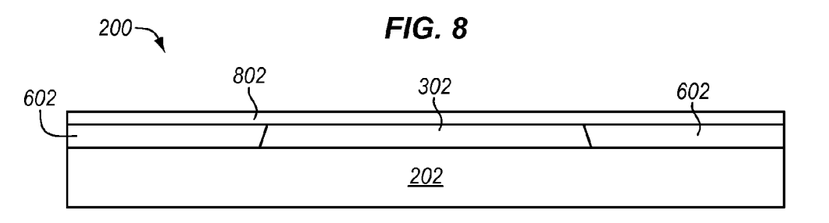
FIG. 8 is a cross-sectional view of a read element with a CMP stop layer deposited according to the method of FIG. 1.
Figure 9:
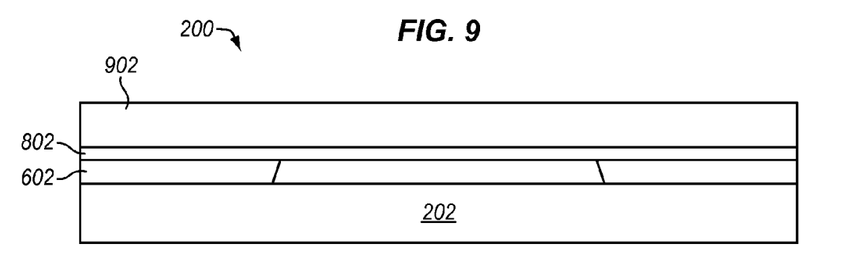
FIG. 9 is a cross-sectional view of a read element with a BARC layer deposited according to the method of FIG. 1.
Figure 10:
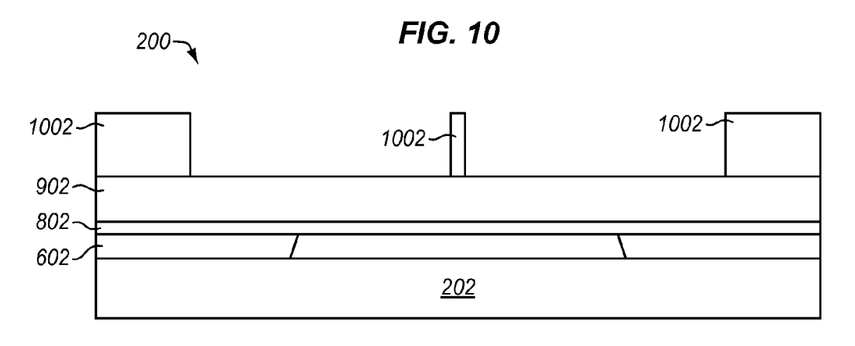
FIG. 10 is a cross-sectional view of a read element with a second photoresist patterned according to the method of FIG. 1.

Step 114 of FIG. 1 comprises depositing a CMP stop layer on the top surface of the MR material 302 and the refill material 602. The CMP stop layer may be comprised of a diamond-like carbon (DLC) material or another type of material. FIG. 8 is a cross-sectional view of read element 200 with CMP stop layer 802 deposited according to step 114. Step 116 of FIG. 1 comprises depositing a bottom anti-reflective coating (BARC) layer on the CMP stop layer 802. The BARC layer may be comprised of DURIMIDE® or another type of material. FIG. 9 is a cross-sectional view of read element 200 with BARC layer 902 deposited according to step 116. Step 118 of FIG. 1 comprises patterning a second photoresist on the BARC layer 902. FIG. 10 is a cross-sectional view of read element 200 with a second photoresist 1002 patterned according to step 118. The second photoresist 1002 is patterned with openings that are used to define the track width of the MR sensor.

Figure 11:
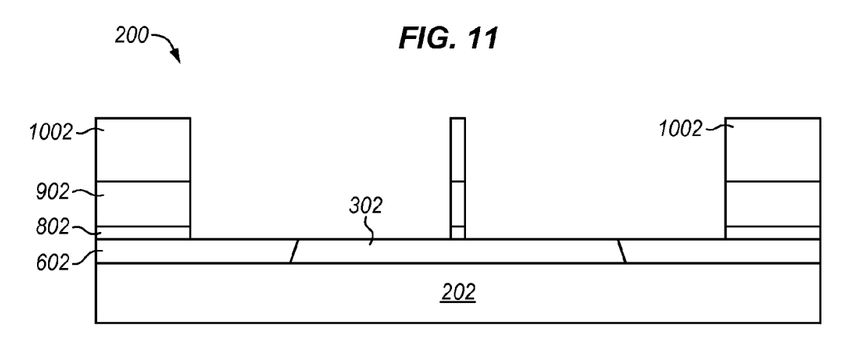
FIG. 11 is a cross-sectional view of a read element after a RIE process of the method of FIG. 1.
Figure 12:
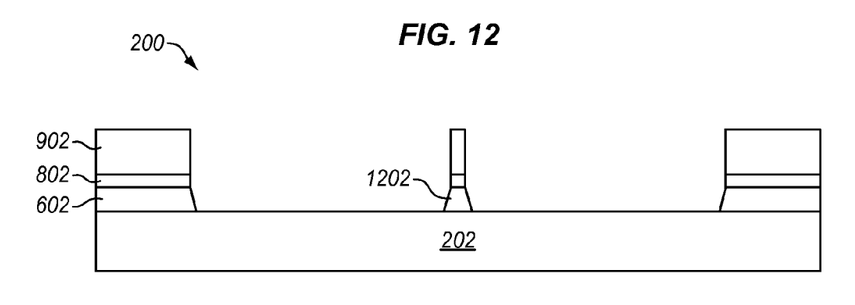
FIG. 12 is a cross-sectional view of a read element after an ion milling process of the method of FIG. 1.

Step 120 of FIG. 1 comprises performing a reactive ion etching (RIE) process to remove the BARC layer 902 and the CMP stop layer 802 exposed by the second photoresist 1002. FIG. 11 is a cross-sectional view of read element 200 after the RIE process of step 120. Step 122 of FIG. 1 comprises performing an ion milling process, or another type of removal process, to remove the MR material 302 exposed by photoresist 1002. FIG. 12 is a cross-sectional view of read element 200 after the ion milling process of step 122. After the ion milling process, the MR sensor 1202 is defined in read element 200 from the MR material 302. The milling process also removes the second photoresist 1002.

Figure 13:
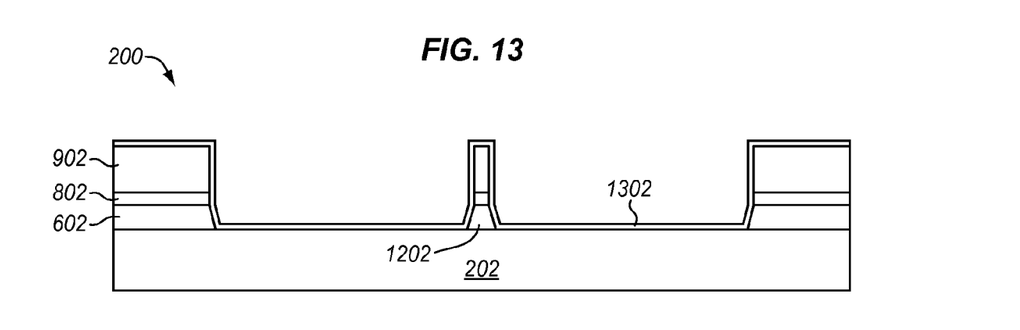
FIG. 13 is a cross-sectional view of a read element with an insulation layer deposited according to the method of FIG. 1.

Step 124 of FIG. 1 comprises depositing an insulation layer on the second photoresist 1002 and on side regions of MR sensor 1202. FIG. 13 is a cross-sectional view of read element 200 with insulation layer 1302 deposited according to step 124. Insulation layer 1302 may comprise an alumina material that is formed using an atomic layer deposition (ALD) process. Insulating layer 1302 may be deposited to have a thickness less than about 80 Å (e.g., in the range of 20 Å to 80 Å).

Figure 14:
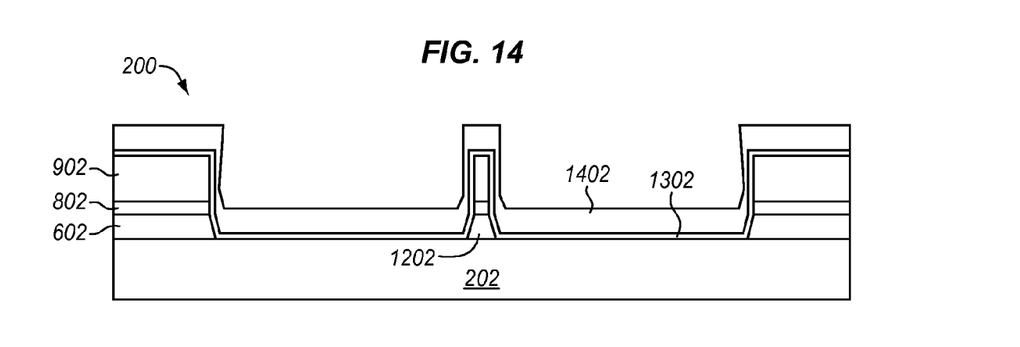
FIG. 14 is a cross-sectional view of a read element with hard bias material deposited according to the method of FIG. 1.

Step 126 of FIG. 1 comprises depositing hard bias material on the insulation layer 1302. The hard bias material is used to form hard bias magnets on side regions of MR sensor 1202. FIG. 14 is a cross-sectional view of read element 200 with hard bias material 1402 deposited according to step 126. The hard bias material 1402 is used to longitudinally bias a free layer (not shown) in MR element 1202. The hard bias material 1402 may be deposited in step 126 by depositing multiple layers of material. For instance, a first seed layer of NiTa or a similar material may be deposited, with a second seed layer of a non-magnetic Cr alloy (e.g., CrMo) deposited on the first seed layer. The hard bias magnetic layer of a magnetic material (e.g., CoPt or CoPtCr) may then be deposited on the seed layers. The hard bias material may be formed with other materials in other embodiments.

In step 126, the hard bias material 1402 is deposited to a threshold thickness so that a height of the top surface of the hard bias material 1402 is less than the height of CMP stop layer 802. In other words, the threshold thickness of the hard bias material 1402 should be such that the top surface of the hard bias material 1402 should be below the CMP stop layer 802 so that a subsequently-performed CMP process does not polish the top surface of the hard bias material 1402.

Figure 15:
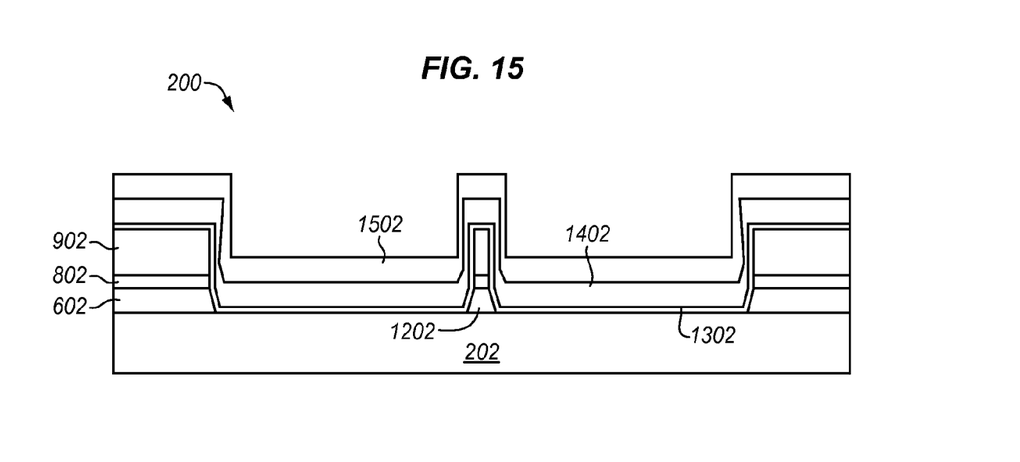
FIG. 15 is a cross-sectional view of a read element with a sacrificial layer deposited according to the method of FIG. 1.

Step 128 of FIG. 1 comprises depositing a sacrificial layer on the hard bias material 1402. FIG. 15 is a cross-sectional view of read element 200 with sacrificial layer 1502 deposited according to step 128. Sacrificial layer 1502 is formed from any material that has a good polishing rate. Sacrificial layer 1502 may be formed with a material that is already used in the read element 200 so that a new material does not need to be introduced into the fabrication stations. For example, Cr or CrMo may be used as sacrificial layer 1502 in addition to being used as a seed layer for the hard bias magnets.

Figure 16:
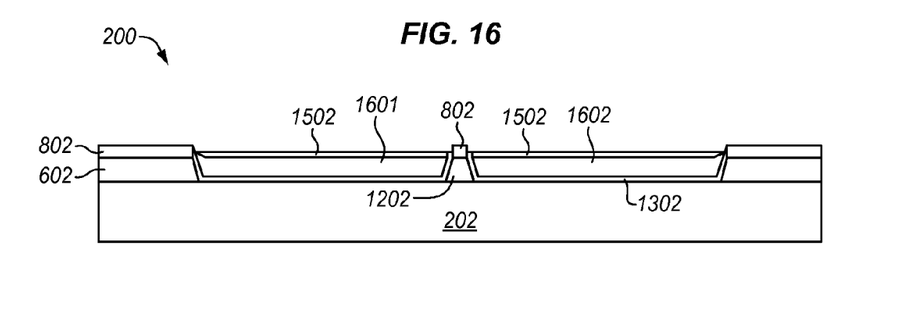
FIG. 16 is a cross-sectional view of a read element after a CMP process of the method of FIG. 1.

Step 130 of FIG. 1 comprises performing a CMP process down to CMP stop layer 802. FIG. 16 is a cross-sectional view of read element 200 after the CMP process of step 130. The CMP process removes the BARC layer 902 and planarizes the top surface of sacrificial layer 1502. After the CMP process, hard bias magnets 1601-1602 are formed on each side of MR sensor 1202 from the hard bias material 1502.

During CMP, the sacrificial layer 1502 is in direct contact with the CMP pads, and not the hard bias material 1402. Therefore, the thickness of the hard bias magnets 1601-1602 is defined by the deposition process of step 126, and is not defined by the CMP process of step 130. The CMP process only reduces the thickness of the sacrificial layer 1502, and does not reduce the thickness of hard bias magnets 1601-1602. Any variations in the CMP process only affect the sacrificial layer 1502 and do not affect the hard bias magnets 1601-1602. As a result, the magnetic performance of the hard bias magnets 1601-1602 is not affected by the CMP process. The hard bias magnets 1601-1602 on each side of MR sensor 1202 will thus have substantially uniform effective magnetic fields, which advantageously lead to improved stability in read element 200.

Figure 17:
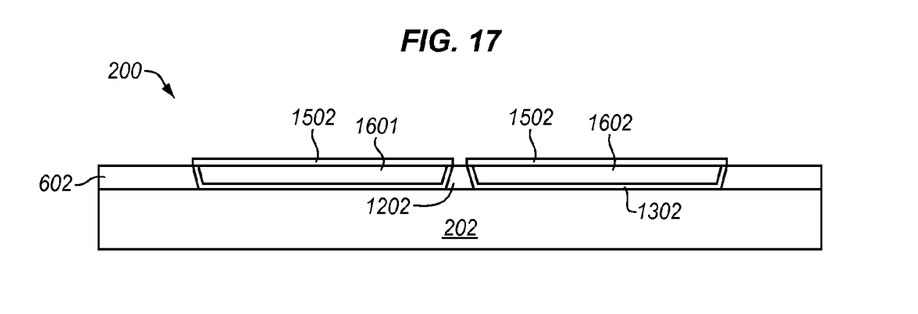
FIG. 17 is a cross-sectional view of a read element after a RIE process of the method of FIG. 1.
Figure 18:
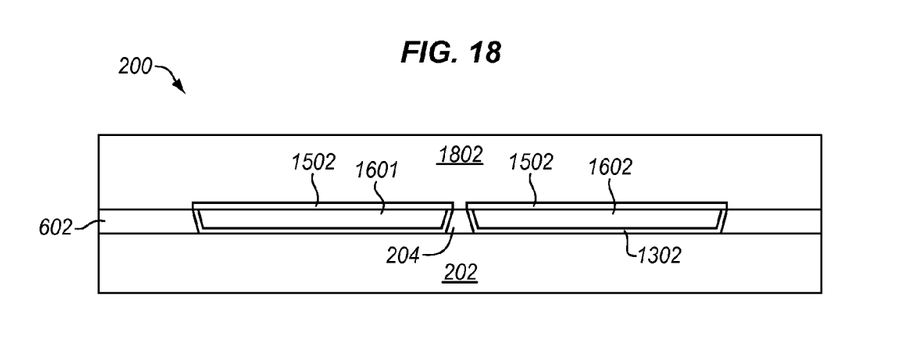
FIG. 18 is a cross-sectional view of a read element with a second shield formed according to the method of FIG. 1.

Step 132 of FIG. 1 comprises performing a reactive ion etching (RIE) process to remove the CMP stop layer 802. FIG. 17 is a cross-sectional view of read element 200 after the RIE process of step 132. Step 134 of FIG. 1 comprises forming a second shield. FIG. 18 is a cross-sectional view of read element 200 with second shield 1802 formed according to step 134. FIG. 18 thus illustrates a completed read element 200 fabricated according to method 100. Read element 200 may comprise a GMR element, a TMR element, or CPP GMR element.

Figure 19:
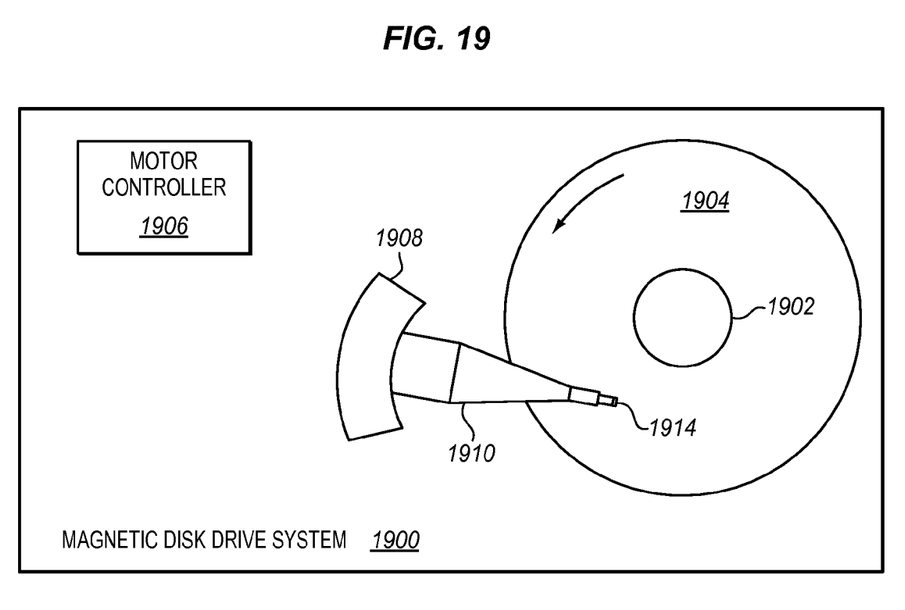
FIG. 19 illustrates a magnetic disk drive system in an exemplary embodiment of the invention.

Read element 200 as illustrated in FIG. 18 may be implemented in a magnetic disk drive system. FIG. 19 illustrates a magnetic disk drive system 1900 in an exemplary embodiment of the invention. Magnetic disk drive system 1900 includes a spindle 1902, a magnetic recording disk 1904, a motor controller 1906, an actuator 1908, an actuator/suspension arm 1910, and a recording head 1914. Spindle 1902 supports and rotates magnetic recording disk 1904 in the direction indicated by the arrow. A spindle motor (not shown) rotates spindle 1902 according to control signals from motor controller 1906. Recording head 1914 is supported by actuator/suspension arm 1910. Actuator/suspension arm 1910 is connected to actuator 1908 that is configured to rotate in order to position recording head 1914 over a desired track of magnetic recording disk 1904. Magnetic disk drive system 1900 may include other devices, components, or systems not shown in FIG. 19. For instance, a plurality of magnetic disks, actuators, actuator/suspension arms, and recording heads may be used.

When magnetic recording disk 1904 rotates, an air flow generated by the rotation of magnetic disk 1904 causes an air bearing surface (ABS) of recording head 1914 to ride on a cushion of air at a particular height above magnetic disk 1904. The height depends on the shape of the ABS. As recording head 1914 rides on the cushion of air, actuator 1908 moves actuator/suspension arm 1910 to position a read element (not shown) and a write element (not shown) in recording head 1914 over selected tracks of magnetic recording disk 1904. The read element in recording head 1914 may comprise a read element 200 (see FIG. 18) as described herein in the above FIGS.

Although specific embodiments were described herein, the scope of the invention is not limited to those specific embodiments. The scope of the invention is defined by the following claims and any equivalents thereof.

We claim:

1. A read element of a magnetic recording head, the read element comprising:
   a first shield;
   a magnetoresistance (MR) sensor formed on and in contact with the first shield, wherein the MR sensor has a top surface;
   an insulation layer formed on and in contact with the first shield within side regions of the MR sensor;
   hard bias magnets formed on and in contact with the insulation layer within the side regions of the MR sensor to a height that is completely below the top surface of the MR sensor;
   a sacrificial layer formed on and in contact with the hard bias magnets within the side regions of the MR sensor to a height that is completely above the top surface of the MR sensor; and
   a second shield formed on and in contact with the MR sensor and the sacrificial layer, wherein the sacrificial layer is sandwiched between and in contact with the hard bias magnets and the second shield within the side regions of the MR sensor.

2. The read element of claim 1 wherein the sacrificial layer is formed from CrMo.

3. The read element of claim 1 wherein the insulating layer has a thickness less than about 80 Å.

4. The read element of claim 1 wherein the MR sensor comprises Giant MR (GMR) sensor.

5. The read element of claim 1 wherein the MR sensor comprises a Tunneling MR (TMR) sensor.

6. A magnetic disk drive system, comprising:
   a magnetic disk; and
   a recording head that includes a read element for reading data from the magnetic disk, the read element comprising:
   a first shield;
   a magnetoresistance (MR) sensor formed on and in contact with the first shield, wherein the MR sensor has a top surface;
   an insulation layer formed on and in contact with the first shield within side regions of the MR sensor;
   hard bias magnets formed on and in contact with the insulation layer within the side regions of the MR sensor to a height that is completely below the top surface of the MR sensor;
   a sacrificial layer formed on and in contact with the hard bias magnets within the side regions of the MR sensor to a height that is completely above the top surface of the MR sensor; and
   a second shield formed on and in contact with the MR sensor and the sacrificial layer, wherein the sacrificial layer is sandwiched between and in contact with the hard bias magnets and the second shield within the side regions of the MR sensor.

7. The magnetic disk drive system of claim 6 wherein the sacrificial layer is formed from CrMo.

8. The magnetic disk drive system of claim 6 wherein the insulating layer has a thickness less than about 80 Å.

9. The magnetic disk drive system of claim 6 wherein the MR sensor comprises Giant MR (GMR) sensor.

10. The magnetic disk drive system of claim 6 wherein the MR sensor comprises a Tunneling MR (TMR) sensor.

* * * * *